United States Patent [19]

Lemelson

[11] 4,162,757
[45] Jul. 31, 1979

[54] MANUFACTURING APPARATUS

[76] Inventor: Jerome H. Lemelson, 85 Rector St., Metuchen, N.J. 08840

[21] Appl. No.: 744,505

[22] Filed: Nov. 24, 1976

[51] Int. Cl.² .............................................. B29F 3/00
[52] U.S. Cl. .................................... 228/1 R; 156/500; 228/18; 425/327
[58] Field of Search ............... 156/500, 501, 244, 441, 156/73.1, 73.2, 580.1, 73.4, 73.5, 580.2; 425/324 R, 325, 327, 505, 515, 517, 520, 521, DIG. 201, DIG. 44, 395, 397, 408, 453, 454, 174.2, 174.4, 576; 264/171, 172; 228/173 R, 173 D, 176, 1 R, 18; 164/86, 76

[56] References Cited

U.S. PATENT DOCUMENTS

| 3,042,569 | 7/1962 | Paul .................. 156/441 X |
| 3,399,425 | 9/1968 | Lemelson ............. 425/327 |
| 3,440,118 | 4/1969 | Obeda ............... 156/580.2 X |
| 3,650,647 | 3/1972 | Jacobs et al. ........ 425/174.2 X |
| 3,661,485 | 5/1972 | Arpajian et al. ........ 425/327 X |
| 3,762,000 | 10/1973 | Menzin et al. ....... 425/576 X |
| 3,938,931 | 2/1976 | Emmel .............. 425/520 X |
| 4,038,011 | 7/1977 | Lemelson ........... 425/467 X |
| 4,050,873 | 9/1977 | Brumlik et al. ..... 425/DIG. 44 X |

FOREIGN PATENT DOCUMENTS

| 51-54665 | 5/1976 | Japan .......................... 425/327 |
| 311170 | 1/1956 | Switzerland ................. 156/441 |

Primary Examiner—Roy Lake
Assistant Examiner—Mark Rosenbaum

[57] ABSTRACT

An apparatus is provided for continuously and automatically forming a fastening material in the form of a sheet or strip containing a multitude of filament-like fastening formations protruding from at least one surface thereof and capable of hooking engagement with similar or differently configured formations provided in a second sheet or strip. In one form, the filamentary formations are continuously or intermittently molded in a plurality of preformed strips of plastic which may be extrusion formed as they are fed or fed from a plurality of coils thereof and the filament containing strips are twisted 90° after the filamentary formations are molded therein to bring the edges of each strip into abutment with the edges or edge portions of adjacent strips whereafter they are continuously welded or otherwise fastened together to form a sheet-like array of strips containing a plurality of parallel rows of filamentary formations. In another form plastic material is continuously or intermittently injection molded into a plurality of strips which are brought into edgewise abutment with each other and welded together to form a wider strip or sheet containing a plurality of rows of filamentary fastening formations. The invention is also drawn to improve configurations in strip-like filamentary material including certain containing hooks, barbs and loop formations.

10 Claims, 10 Drawing Figures

4,162,757

MANUFACTURING APPARATUS

SUMMARY OF THE INVENTION

This invention relates to an apparatus for producing strip-like fastening material and to improvements in such fastening material.

Various techniques have been proposed and employed to produce so-called multiple filament fastening materials such as those having the trade name Velcro. Such techniques have included the defamation and stitching of filamentary formations of plastic such as polyamide resin through a textile material to form loops thereof which loops are laser cut to form hook-like formations. Other methods have included partially embedding a sinusoidally deformed filament or strip of plastic in a molten substrate and retaining the deformed strip protruding from the surface of the substrate whereafter the loop formations are cut to form hook-like formations. A molding technique has also been employed for forming a plurality of rows of small hook-like formations in the outer surface of a short strip-like or button shaped substrate that this technique has been extremely limited in application due to the extreme cost of the mold requiring a multitude of movable segments.

By means of the apparatus and method employed herein, a plurality of strips of plastic are simultaneously molded, preferably in parallel array and preferably on a continuous basis or in a manner whereby substantially long strips of material are formed with the filamentary formations of each extending in a common plane so that they may be simultaneously molded between a single pair of mold sections and automatically driven from between the mold sections. Such molded strips of single rows of fastening filamentary formations are each guided in a manner to turn each strip 90° so that all fastening elements extend parallel to each other rather than in a single plane, after which the border portions of the strips are butt or lap welded together or are bonded or welded to a common substrate to form a fastening member composed of a plurality of such strips and a plurality of fastening filamentary formations extending outwardly from the substrate. By means of such an apparatus and method not only may hook-like fastening elements of improved structure be formed automatically and without the necessity of any post operation on the filamentary material such as cutting but otherwise shaped fastening elements such as loop-like formations, mushroom headed formations, barbed formations, etc. may also be rapidly and inexpensively mold formed and assembled without the waste of material.

Accordingly, it is a primary object of this invention to provide a new and improved apparatus for automatically and continuously forming strip-like fastening materials.

Another object is to provide an apparatus for forming strip-like fastening material by molding filamentary fastening formations in a plurality of strips of plastic and assembling such formations into a wider strip or sheet.

Another object is to provide an apparatus for forming a strip or sheet material containing a plurality of rows of hook-like fastening formations protruding outwardly from a surface thereof wherein the molding apparatus employs a simple two-part mold and does not require a complex many part mold.

Another object is to provide an apparatus and method for automatically forming a multiple element fastening material on a previously formed substrate.

Another object is to employ extrusion and molding techniques for automatically forming complex plastic shapes.

With the above and such other objects in view as may hereafter more fully appear, the invention consists of the novel constructions, combinations and arrangements of parts as will be more fully described and illustrated in the accompanying drawings, but it is to be understood that changes, variations, and modifications may be resorted to which fall within the scope of the invention as claimed.

Figure 3:
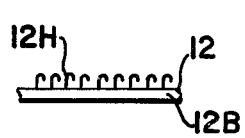
FIG. 3 is a side view of one of the strip-like fastening elements formed in the apparatus of FIGS. 1 and 2 prior to welding said fastening element to other fastening elements of similar configuration.
Figure 4:
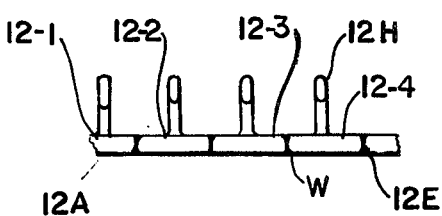
FIG. 4 is an end view of a portion of the strip-like fastening material formed by means of the apparatus of FIGS. 1 and 2.
Figure 5:
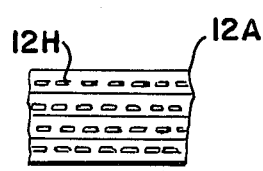
FIG. 5 is a plan view of a portion of the material illustrated in FIG. 4.

The apparatus of this invention is operable to produce rigid or flexible sheet or strip-like material of the type illustrated in FIGS. 3–5 which is composed of a plurality of elongated molded strips which are illustrated as four in number denoted 12-1 to 12-4 although many more of such strips may be formed and employed to form the wider strip-like material. Each of these strips is compression or injection molded with at least one row of fastening elements such as hook-like formations and, if they are produced continuously in parallel array with other similar strips wherein the fastening elements protrude laterally from a surface of each strip in the as-molded condition and wherein the strips may be driven or guided so that the fastening elements of each stand upwardly and extend in the same directions parallel to each other thereby providing them in a condition whereby the two side edges of the strips, which are now void of fastening elements, may be welded to side edges of adjacent strips. In a particular form of the instant invention, the apparatus provides for the compression or injection molding of a plurality of such fastening element containing strips on a continuous basis and the feeding thereof to a welding means for edgewise welding the strips together to form wider strips or sheets thereof.

Figure 1:
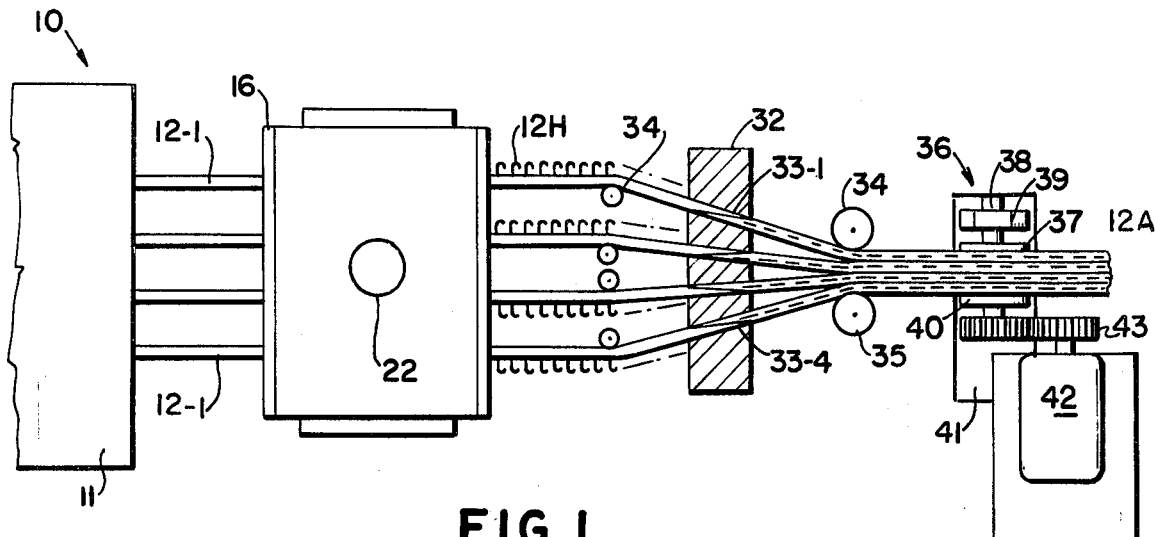
FIG. 1 is a plan view with parts broken away for clarity of an apparatus for continuously forming a fastening material of a plurality of strips which are compression molded with hook-like formations therein.
Figure 2:
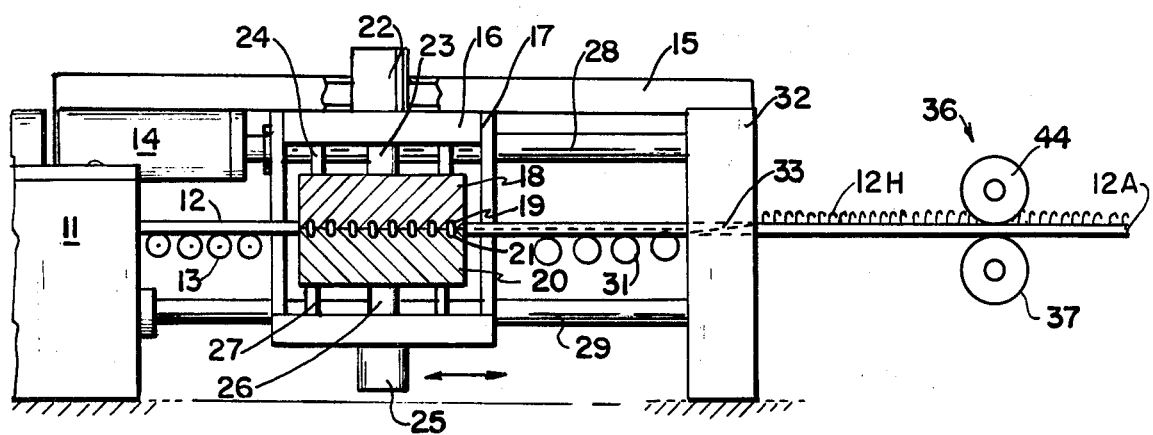
FIG. 2 is a side view with parts broken away for clarity of a modified form of the apparatus of FIG. 1.

In FIGS. 1 and 2 is shown an apparatus 10 for controllably forming sheet or strip-like material having a plurality of rows of irregular surface formations molded therein, such as hooks or loops utilized for fastening purposes. Apparatus 10 includes an extrusion machine 11 operable to continuously extrude a plurality of strips or rods 12, denoted 12-1 to 12-4 as a parallel array which are continuously fed therefrom to a molding apparatus 16 along a powered roller conveyor 13 for the purpose of molding tandem irregular formations such as hook-like formations 12H along one side of each strip 12 as shown in FIG. 3. The apparatus 16 includes respective reciprocally movable compression mold half sections 18 and 20 which are movably supported within a frame 17 which frame is movable along horizontal tracks 28 and 29 supported between the extruder 11 and upright frame 32 located a distance downstream of 11.

The mold halves 18 and 20 are each movable toward and away from the other within the frame 17 on respective parallel guides 24 and 27 connected to the frame, wherein the movement is simultaneously effected to open and close the mold against the freshly extruded strips of plastic to mold the hook-like formations 12H in those portions of the strips disposed between the mold halves, by means of lineal actuators 22 and 25 connected respectively to the upper and lower portions of the frame. The output shafts 23 and 26 of the actuators 22 and 25 are each connected to the respective mold halves 18 and 20 and the actuators are designed to separate the mold halves simultaneously while the sections of the strips molded therebetween are ejected by conventional ejection means to permit the strips to continue their travel downstream of the molding assembly 16 as illustrated.

The frame 17 and the mold connected thereto is operable to travel along the track pairs 28 and 29 and to be moved at the speed of the extruding material while compression molding is effected by means of the mold, by means of a lineal actuator or a motor 14 supported by the main frame 15 which is supported at one end by the extruder and at the other end by the upright support 32. The actuator 14 operates to advance the frame 17 and assembly 16 from a retracted position to an extended position during which travel the mold sections 18 and 20 are moved against a selected portion of the lengths of the freshly extruded strips 12 and compression mold same with the hook-like formations 12H. When the molding material is solidified, preferably by a liquid coolant circulated through passageways 18P and 20P in the mold sections 18 and 20, the actuators 22 and 25 operate simultaneously to retract the mold sections and open the mold, and the actuator or motor 14 immediately retracts the assembly 16 and locates it in direct alignment with the next length of the freshly extruded strips 12 to permit the open mold sections 18 and 20 to come together thereagainst and compression mold said strips in a repeat of the described cycle.

Located within the support 32 are a plurality of guides or passageways denoted 33-1 to 33-4 through which passageways respective of the molded strips 12-1 to 12-4 are driven and caused to converge toward each other, as illustrated in FIG. 1. The passageways 33-1 to 33-4 are so shaped as may be auxiliary guides (not shown) for the strips 12 to cause said strips to be twisted or rotated 90 degrees so as to dispose the fastening elements 12H which protrude laterally therefrom to extend upwardly from the strips and parallel to each other as illustrated in FIG. 2, thus providing an array of strips or fastening elements which are parallel to each other and which form a wider strip or sheet downstream of the support 32.

The strips 12 are guided together so that the lateral edges 12E of the base portions 12B of each strip abut the lateral edges of the adjacent strips as illustrated in FIG. 4 or, in another embodiment, overlap each other, and are in a condition to be butt or lap welded together by means of a welding apparatus 36 located beyond the guide rolls 34 and 35. Actually the guide rolls 34 and 35 may be composed of a plurality of guides and rollers which are power rotated and/or free wheeling and are located along a substantial length of the strips to properly bring them into edgewise or lapping abutment beyond the support and guideway 32.

The welding apparatus 36 is composed of a plurality of welding wheels, each defining respective lower and upper assemblies 37 and 44 supported on respective power driven shafts and energized by means of suitable radiation, such as ultrasonic or radio frequency energy so that each welding wheel which engages respective portions of adjacent abutting surfaces of the bases of abutting strips may cooperate with an aligned welding wheel in effecting the edgewise butt welding or lap welding of the strip bases together to form a wider strip composed of the plurality of strips passed through the welding apparatus wherein the wider strip is composed of a plurality of rows of fastening elements 12H which protrude outwardly from a face thereof wherein a substantial number of such fastening elements may simultaneously engage another fastening material, such as a pile fabric, to provide a suitable fastening assembly of the two materials. Notation W refers to the weld lines provided between adjacent edge portions of adjacent strips. In FIG. 1, the assembly of welding wheels 37 is supported on a shaft 38 supported by bearings 39 and 40 which are supported on the frame 41 supporting a motor 42 which is connected by gears to drive the shaft 38 in power operating the wheel assembly for driving the abutted strips through the welding apparatus. Suitable radiation generating means is connected to the welding wheels for energizing same continuously as the strips are driven therethrough.

Beyond the welding apparatus 36 the welded assembly 12A may be wound in a coil or cut to selected lengths.

In another embodiment, the intermittent compression molding apparatus of FIGS. 1 and 2 may be replaced by an intermittently operating injection molding apparatus which is operated to injection mold new lengths of strip-like material against previously molded lengths of strips containing fastening elements molded integral therewith to provide a continuous array of strips which are guided from the molding machine into edgewise abutment with each other as provided in the apparatus of FIGS. 1 and 2 and are welded together to form a wider strip of fastening material. In such an arrangement, the extrusion apparatus 11 would be eliminated.

In yet another arrangement, a plurality of strips, such as strips 12, may be continuously or intermittently molded adjacent to each other with the fastening formations 12H of each formed parallel to each other instead of in the same plane as provided in FIGS. 1 and 2, by means of suitable cam operated mold components, so that they may be fed together into edgewise abutment without the need to twist them 90 degrees as they come from the molds as is necessary in the apparatus of FIGS. 1 and 2.

In still another embodiment, the strips 12 molded by one of the means described above may be continuously guided and fed from the molding apparatus so that the bottom surfaces of the base portions thereof are brought into abutment with a sheet of plastic, textile material or other material to which they may be welded, adhesively bonded or otherwise fastened in paralle array to provide a sheet or other formation having parallel rows of fastening elements protruding from a major surface thereof.

Figure 6:
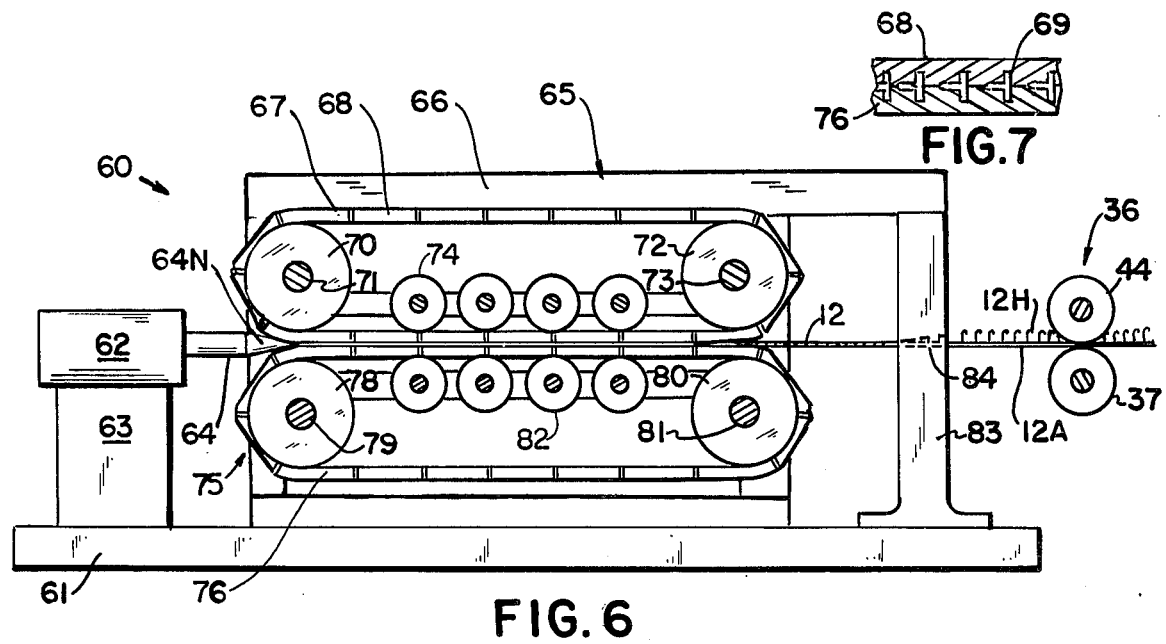
FIG. 6 is a side view of another form of apparatus for forming a strip or sheet-like fastening material of the type illustrated in FIGS. 3–5.
Figure 7:
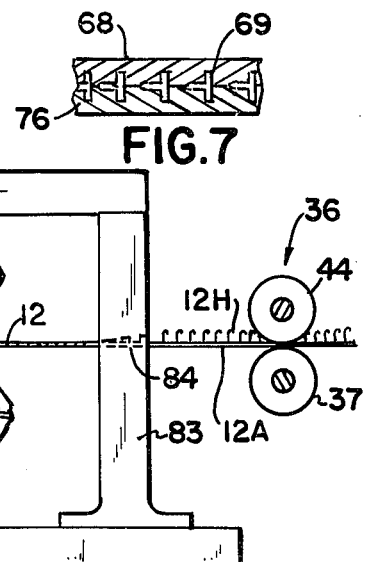
FIG. 7 is a fragmentary view in cross-section of a portion of a mold applicable to the apparatus of FIG. 6.
Figure 8:
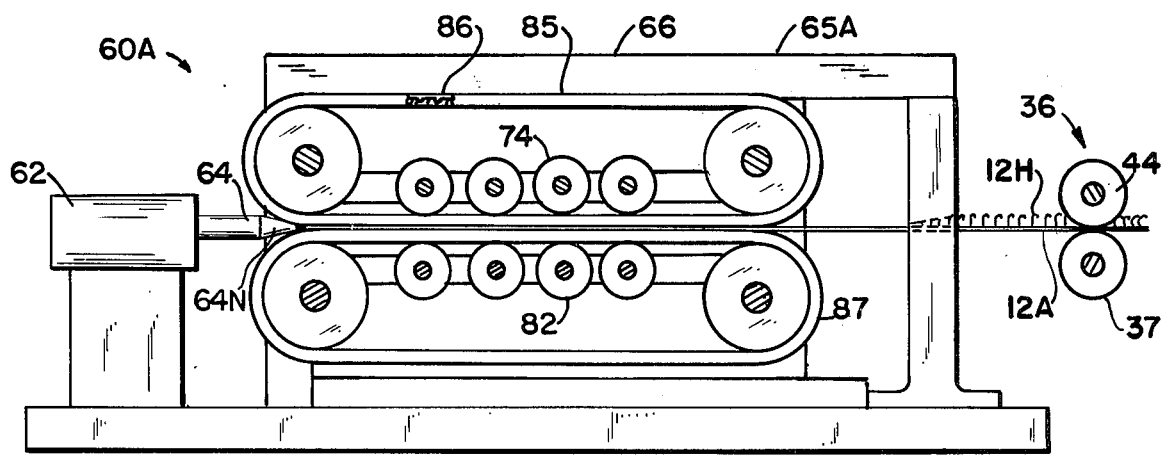
FIG. 8 is a side view of a modified form of the apparatus illustrated in FIG. 6.
Figure 9:
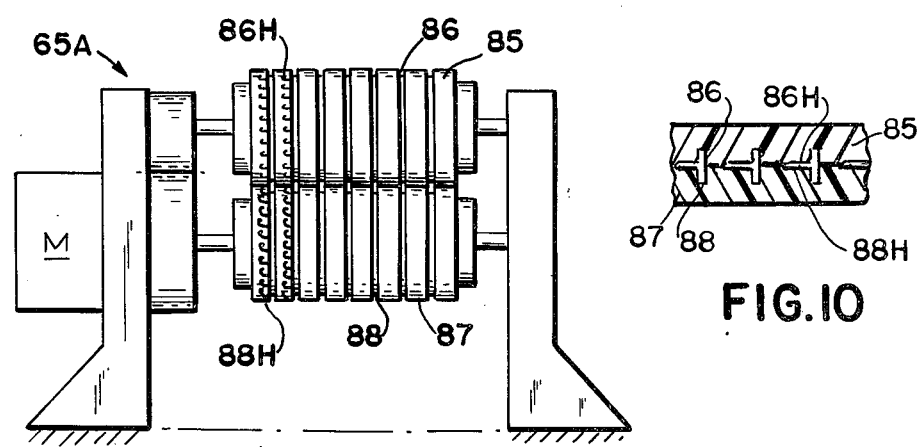
FIG. 9 is an end view of a portion of the apparatus of FIG. 8.

The apparatus of FIGS. 1 and 2 may be replaced by an automatically operating continuous injection molding apparatus of the types illustrated in FIGS. 6–9. In FIG. 6, an apparatus 60 is provided which includes a base or support 61 containing a continuous extrusion machine 62 supported on a mount 63 above the base and having a nozzle head 64 extending from the extruder 62 and containing a plurality of injection nozzles 64N, each of which is inserted between the respective injection location of an injection mold assembly defined by respective assemblies 67 and 75 of respective hingedly attached mold plates 68 and 76. The assemblies 67 and 75 form endless flight arrays of molds 68 and 76 which are respectively driven about drive and guide means defined by pairs of rollers or sprockets 70, 72 and 78, 80. The sprockets 70, 72 are respectively supported on shafts 71 and 73 and the sprockets 78, 80 are supported on their shafts 79 and 81 which shafts are supported for rotation by bearings (not shown) supported by a frame 66 defining part of the injection molding machine 65 and supported on and above the main frame or base 61. The respective ends of the nozzles 64N are frictionally engaged between respective of the molds 68 and 76 and are engaged by the surfaces of channels or grooves therein which form the elongated cavities between which injection molding material is flowed from the nozzles. The cavities (which are illustrated in FIG. 9) are shaped with respective subcavities defining the fastening elements or hook-shaped formations 12H which are molded laterally in each of the strips disposed between the molds and which are caused to face upwardly by means of respective guideways 84 provided within an upright support 83 which is the equivalent of support 32 of FIGS. 1 and 2 and the guides 33 therein which operate to twist the molded formations 12 90 degrees to dispose the hook-like formations 12H in an upward direction parallel to each other so that when the respective parallel strips 12 are brought together beyond the support 83, they may be edgewise abutted and welded as described by means of a welding apparatus 36 similar to that illustrated in FIG. 1.

FIG. 7 illustrates a fragment of two of the molds of the assemblies 67 and 75 of molds showing the endwise views of the cavities 69 therein into which the tapered tip portions 64 end of the nozzles are inserted to inject or extrude plastic at a constant rate which is molded between the molds of the belt-like assemblies 67 and 75.

The apparatus 60A of FIG. 8 is quite similar to that of FIG. 6 with the exception that the hinged arrays 67 and 75 of molds is replaced by respective endless belts 85 and 87 of flexible material such as flexible stainless steel sheet or flexible plastic such as polyurethane which is shaped with respective channel-like cavities 86 and 88 in the outer surfaces of the belts containing the subcavities 86H and 88H for forming the fastening elements or hook-like formations on the strip-like materials injected into the cavities formed of the strip-like cavities 86 and 88. The molding cavities are illustrated in FIG. 9 and it is noted that the belts 85 and 87 may also be replaced by respective drums configured as illustrated in FIG. 9 and between which plastic is injected by respective nozzles and rapidly set therebetween.

In both FIG. 6 and FIG. 8 notations 74 and 82 refer to respective arrays of power driven rolls engaging the inside faces of those portions of the belts or hinged arrays of molds located adjacent one another so as to compressively engage same together and prevent leakage of molding material as the material is set to shape therebetween to form the strip-like moldings 12. Also shown in FIG. 9 is a gear motor M which is operable to power rotate at least one of the four sprockets or drums 70, 72, 78, 80.

Figure 10:
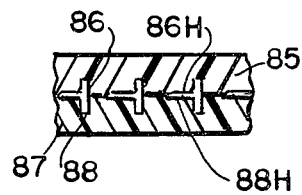
FIG. 10 is a side view in cross-section of a component, such as a belt molding means of the apparatus of FIGS. 8 and 9.

FIG. 10 illustrates a fragment of the engaged portions of the belts 85 and 87 showing the cavities formed therebetween of the channel-like formations 86 and 88.

In the operation of the apparatus of FIGS. 8 and 9, the plastic injection nozzles 64N are disposed with their tapered tip portions frictionally and slidable engaged between the endless belts 85 and 87 in a manner to effect sealing of the surfaces of the nozzles against the converging belts so that molten or liquid resin ejected continuously from the nozzles flows only into the strip-like molding cavities formed of the cavities 86 and 88 and their branch formations 86H and 88H which are formed in the respective flexible belts. The rate of flow of molding material from each of the nozzles 64N is regulated in accordance with the speeds of the motor M driving the drums around which the belts 86 and 87 are driven in their endless paths so that the cavities and subcavities will be completely filled with resin without molten resin being blown backwardly along the interfaces between the nozzles and the surfaces of the belts.

As indicated, the flexible and relatively thick molding belts 85 and 87 may be molded of a suitable flexible plastic resin such as polyurethane or may be formed of thinner metal sheet such as stainless steel sheet having the molding channels 86 and 88 and the subcavities 86H and 88H formed therein by machining, chemical etching or electrical discharge machining. To ellect suitable fluidic sealing between the tip portions 64N of the parallel nozzles, portions of the nozzles may be made of flexible plastic such as polyurethane resin or may contain respective sealing or O-rings surrounding same.

I claim:

1. An apparatus for forming a strip of fastening material having a plurality of rows of fastening elements molded integral with and protruding from a surface thereof, said apparatus comprising:

first means for continuously forming and parallely feeding a plurality of strip-like elements in a given direction, wherein each of said strip-like elements contain a row of fastening formations integrally formed with a base strip portion and protruding outwardly from such base strip portion, second means downstream of said first means for receiving and continuously bringing such strip-like elements into engagement with each other as they are fed with the fastening formations of each strip-like element extending parallel to the fastening formations of the other strip-like elements, and third means downstream of said second means for edgewise securing said strip-like elements together to provide a unitary formation thereof, which formation contains said plurality of rows of fastening formations protruding outwardly from a surface thereof.

2. An apparatus in accordance with claim 1 wherein said first means is operable to mold such fastening formations as a plurality of hook-like formations protruding from such strip-like elements.

3. An apparatus in accordance with claim 1 wherein said first means is operable to mold such fastening formations as a plurality of loop-like formations protruding from such strip-like elements.

4. An apparatus for forming filamentary fastening material and the like comprising in combination:
   first means for supplying a plurality of narrow strips of plastic material,
   second means located downstream of said first means for guiding such strips parallel to each other,
   third means downstream of said second means for receiving such strips and molding each to form at least one row of filament-like fastening element formations protruding from a surface of each strip,
   fourth means downstream of said third means for receiving said strips and positioning them to dispose the fastening element formations of each strip parallel to those of the other strips,
   fifth means downstream of said fourth means for securing the lateral edge portions of each strip to the edge portions of the adjacent strips to form a strip-like fastening material containing parallel rows of upstanding fastening elements extending longitudinally along the length of such a strip-like formation and protruding outwardly from a face thereof.

5. An apparatus in accordance with claim 4 wherein said third means comprises a compression molding machine which operates to intermittently compression mold tandem lengths of the strips of thermoplastic material fed from said first means with said fastening element formations.

6. An apparatus in accordance with claim 4 wherein said first means comprises an extrusion machine for extrusion forming such plurality of such narrow strips of plastic material.

7. An apparatus in accordance with claim 6 including means operatively associated with said third means for moving said third means at substantially the speed of extrusion to permit it to operate on the plurality of strips of plastic material as they are fed from said first means without interrupting their movement from said first means.

8. An apparatus in accordance with claim 7 wherein said third means comprises a compression molding machine having cooperating mold sections and means operatively associated with said mold sections for reciprocating each of said mold sections to bring them together against said plurality of strips of plastic material and to separate them from such strips after compression molding such strips to form said fastening element formations.

9. An apparatus in accordance with claim 8 including means operatively associated with said mold members for moving said cooperating mold members of said compression molding machine longitudinally with said plurality of strips so as not to interfere with the movement of such strips from said first means.

10. An apparatus in accordance with claim 4 wherein said fifth means is operable to butt weld the edge portions of such strips together.

* * * * *